United States Patent [19]

Ohsawa

[11] Patent Number: 5,463,676
[45] Date of Patent: Oct. 31, 1995

[54] KEY TELEPHONE SYSTEM WITH A VOICE STORAGE EQUIPMENT

[75] Inventor: Shigeru Ohsawa, Kanagawa, Japan

[73] Assignee: Nitsuko Corporation, Kawasaki, Japan

[21] Appl. No.: 20,837

[22] Filed: Feb. 22, 1993

Related U.S. Application Data

[63] Continuation-in-part of Ser. No. 754,468, Sep. 4, 1991, abandoned.

[30] Foreign Application Priority Data

Sep. 4, 1990 [JP] Japan .................. 2-092930 U

[51] Int. Cl.⁶ .................................................. H04M 1/64
[52] U.S. Cl. ..................... 379/67; 379/88; 379/142; 379/157; 379/165
[58] Field of Search ..................... 379/67, 88, 142, 379/157, 165

[56] References Cited

U.S. PATENT DOCUMENTS 4,790,003  12/1988  Kepley et al. .
4,853,952  8/1989   Jachmann et al. .
4,926,462  5/1990   Ladd et al. .
5,200,994  4/1993   Sasano et al. .................... 379/245

FOREIGN PATENT DOCUMENTS 63-23455  1/1988  Japan .

Primary Examiner—Jeffery A. Hofsass
Assistant Examiner—Fan Tsang
Attorney, Agent, or Firm—Armstrong, Westerman, Hattori, McLeland and Naughton

[57] ABSTRACT

A key telephone system with a voice storage equipment has means for memorizing voice mail messages, sender and receiver phone numbers, a recording time and means for displaying the recording status of the voice mail messages in the voice storage equipment on a display of the key set and a display panel connected with a main equipment.

5 Claims, 3 Drawing Sheets

| MESSAGE NUMBER |
| --- |
| CONDITION OF USE IN THIS AREA |
| SENDER PHONE NUMBER |
| RECEIVER PHONE NUMBER |
| TIME OF INFORMATION ARRIVAL |
| ADDRESS OF A VOICE MEMORY 7 |

Fig. 2

KEY TELEPHONE SYSTEM WITH A VOICE STORAGE EQUIPMENT

This is a continuation in part of application Ser. No. 07/754,468, filed Sep. 4, 1991, now abandoned.

BACKGROUND OF THE INVENTION

1. Field of the Invention

This invention relates to a key telephone system comprising voice storage equipment.

2. Description of the Prior Art

A conventional key telephone system with voice storage equipment can only play back recorded voice mail messages in order starting from the most recent one. Accordingly, one could not find out the number of voice mail messages recorded during one's absence nor could one play back the desired message.

In view of the above, the present invention offers the key telephone system with voice storage equipment which will indicate the number of voice mail messages received, and permit users (individual or groups of users) to select and play back the desired voice mail messages using a displayed list of recorded messages.

SUMMARY OF THE INVENTION

In order to address the problems described above, the key telephone system with the voice storage equipment of the present invention was developed to include characteristics such as ability to memorize sender and receiver phone numbers as well as the recording time of voice mail messages, a display of the recording status of the voice mail and/or the display panel connected with the main equipment, selection of the voice mail message for play back optionally.

Through constructing the key telephone system with voice storage equipment as described above, it can display the recording status of the voice mail messages in a list. So, the receiver is able to confirm the status of the recording voice mail messages from the list, and select and play back the desired voice mail at will.

BRIEF DESCRIPTION OF THE DRAWINGS

FIG. 2 shows information stored in a directory memory 8; and

DESCRIPTION OF THE PREFERRED EMBODIMENTS

An embodiment of the present invention will be described below in detail with reference to the accompanying drawing.

Figure 1:
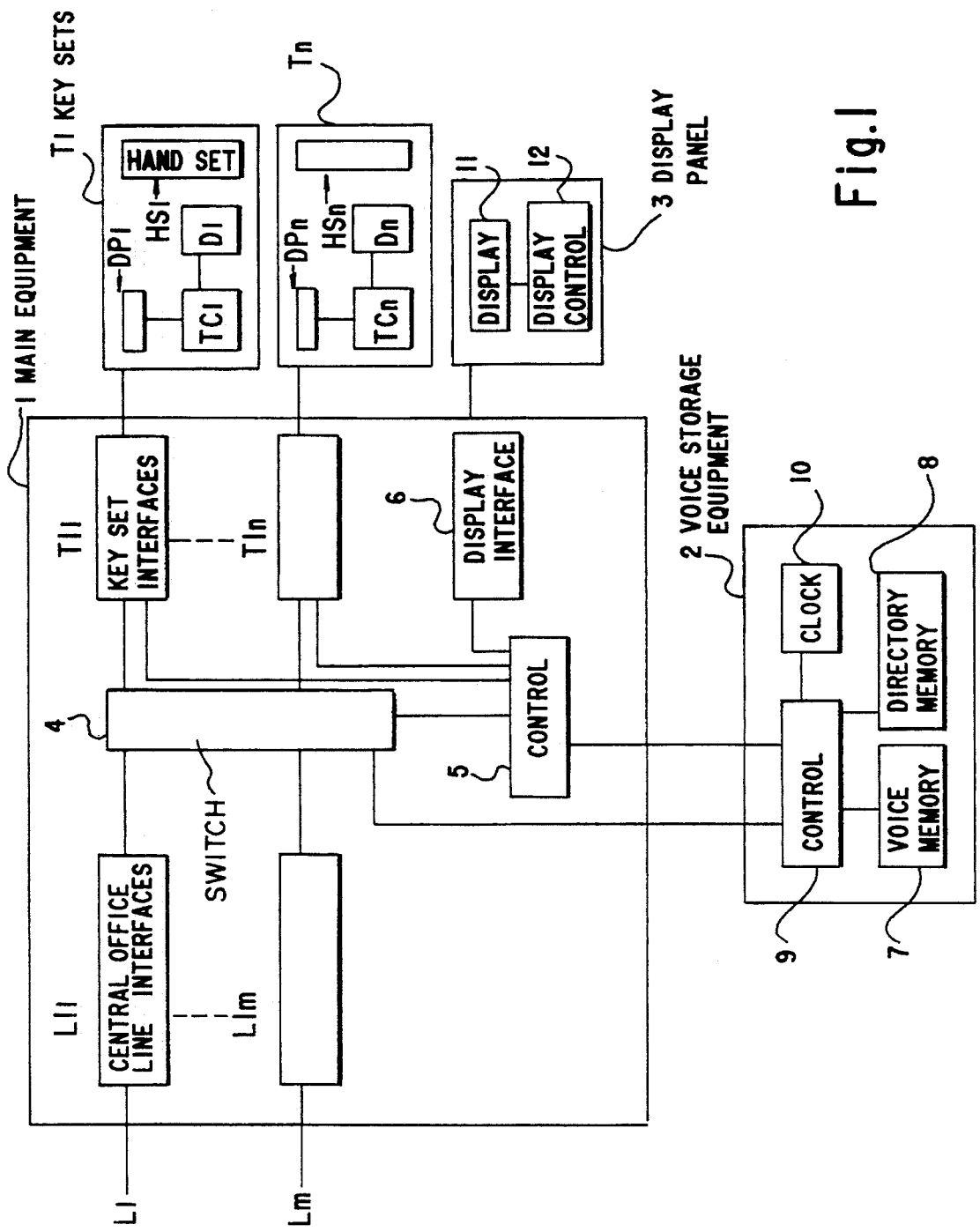
FIG. 1 shows the construction of a key telephone system with a voice storage equipment.

FIG. 1 shows the construction of a key telephone system with a voice storage equipment. As shown in the figure, the key telephone system is composed of main equipment 1, central office lines L1~Lm, voice storage equipment 2, a display panel 3 and key sets T1~Tn.

The main equipment 1 comprises a control 5 which controls all of the apparatus, central office line interfaces LI1~LIm, key set interfaces TI1~TIn, a switch 4 to connect with central office lines L1~Lm and key sets T1~Tn and a display interface 6.

The voice storage equipment 2 comprises a control 9 which controls all of voice storage equipment 2 as well as signals and data sent and received from the main equipment 1, a voice memory 7, a directory memory 8 and a time clock 10.

The display panel 3 comprises a display 11 and a display control 12 that controls the display panel 3.

The key sets T1~Tn comprise key set control TC1~TCn which control each of key telephone system, dial key D1~Dn and display DP1~DPn.

In the key telephone system, for example, when a sender dials from a key set T1, he/she lifts up a hand set HS1, pushes dial key D1 and sends a receiver phone number. The receiver phone number is sent to the control 5 via the key set interface TI1. The control 5 discriminates the receiver phone number between an extension line and a outside line. If the sender calls via an extension line (for example, via key set T1), the control 5 connects the sending extension line with one of the other extension lines (for example, one of key sets T2-Tn) corresponding to the receiver phone number. This connection is performed via switch 4, and one of the other key set interfaces (TI2-TIn). At the same time, the control 5 sends the receiver phone number to the control 9 in voice storage equipment 2. The control 5 can recognize the sender phone number (for example T1 of T1-Tn) since each of the key sets T1-Tn is connected to a corresponding key set interface TI1-TIn, the key set interfaces in communication with the control 5.

If the sender calls via an outside line, the control 5 controls the switch 4 and connects the outside line with one of the central office interfaces (LI1-LIm). As when the sender calls via an extension line, the control 5 sends the phone number of the sender to control 9.

The call signal sent through the outside line arrives at the key set T1~Tn through the central office line interface LI1~LIm, the switch 4, and the key set interfase TI1~TIn. For example, when the key set T1 rings, a receiver lifts up the hand set HS1 and talks. If the key set T1 is in absence mode, an absence message is sent to an outside sender through the key set interface TI1~TIn, the switch 4 and the central office line interface LI1~LIn and at the same time the message is sent to the control 5 through the key set interface TI1~TIn. The control 5 discriminates which receiver key set(one of the key sets T1~Tn) is in absence mode and sends the phone number as the receiver phone number to the control 9 in the voice storage equipment 2 and controls the switch 4 and sends the voice mail message from the sender. And in this case, the sender phone number is also sent to the control 9. In FIG. 1, the central office lines L1~Ln are the known ISDN (integrated digital network) and the sender phone number is sent as the telephone office service within the ISDN. Thus, the sender phone number is sent to the control 9 through the ISDN.

The control 9 in the voice equipment 2 gives the sent message a message number and stores the message number, the sender phone number, the receiver phone number and the address of the voice memory 7 etc., in the directory memory 8. The voice mail message is stored in the voice memory 7. FIG. 2 shows the information which is stored in the directory memory 8. The time when the control 9 stores the information in the directory memory 8 is stored in time of information arrival area by reading the time from the clock 10.

Also, the control 9 in the voice storage equipment 2 displays the recording status of the voice mail messages on the display panel 3 within the group of the display DPn of the key set Tn through the key set TIn of key telephone system and the display interface 6 by requesting from key set Tn. And the control 9 can display the recording status on the display panel 3 within the group of the display DPn of the key set Tn through the display interface 6.

Figure 3:
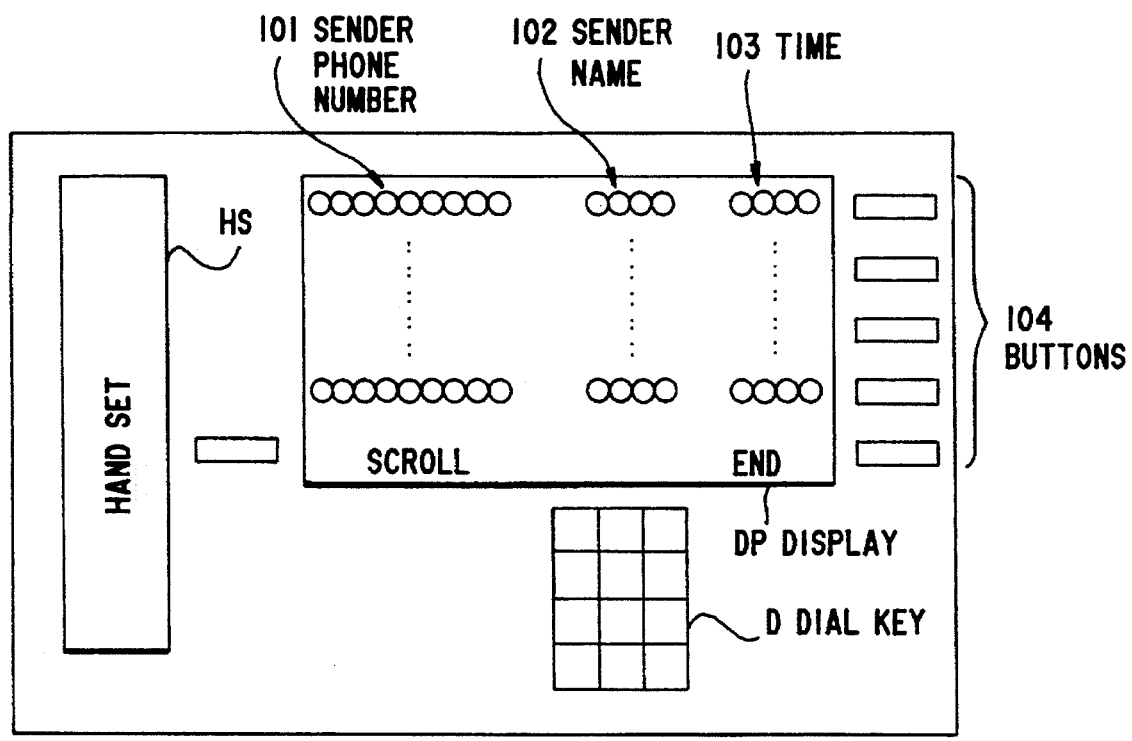
FIG. 3 shows displayed information on a display DPn of a key set Tn.

FIG. 3 shows a display of the display DPn of the key set Tn. As shown in the figure, the sender phone number 101, the sender name 102, time of information arrival 103 are displayed on the display DPn. After the receiver of key set Tn sees the recording status of the voice mail messages on the display DPn, he/she selects the voice mail message optionally by pushing a button 104 (the button 104 corresponds to the message number in FIG. 2) and sends the selected signal to the control 5 through the key set interface TI1~TIn. And the sender name is found by the phone number and displayed because the name is previously recorded correspondingly to the phone number.

The control 9 in the voice storage equipment 2 accesses the address corresponding to the message number in the voice memory 7, reads out from the voice memory 7 and sends the voice mail message to the key set T1~Tn through the switch 4 in the main equipment 1 and the key set interface TI1~TIn.

As herein disclosed, the invention enables the receiver to play back the recorded voice mail messages by displaying the recording status of the voice mail messages on the display DP1~DPn of the key set Tn~Tn and/or the display panel 3.

What is claimed is:

1. A telephone switching system, comprising:

main equipment;

a display panel connected to said main equipment;

a plurality of key sets; and voice storage equipment in communication with said plurality of key sets via said main equipment and which records and plays back voice mail messages from incoming central office lines and from said plurality of key sets, means for memorizing at least one voice mail message, sender and receiver phone numbers and a recording time in said voice storage equipment;

means for displaying a status of each recorded voice mail message on a display of each of the plurality of key sets; and means for displaying a status of each recorded voice mail message on said display panel connected to said main equipment;

wherein said means for memorizing at least one voice mail message in said voice storage equipment comprises a time clock for keeping time, a control for controlling operations of said voice storage equipment, a voice memory for storing voice mail messages, and a directory memory for storing sender and receiver phone numbers and a time of the storing of each voice mail message, the sender phone numbers being phone numbers of originators of said voice mail messages from said incoming central office lines and said plurality of key sets, said receiver phone numbers corresponding to phone numbers of said plurality of key sets for receivers of said voice mail messages, and the time of the storing of each voice mail message being measured by said time clock within said voice storage equipment.

2. The telephone switching system claimed in claim 1, further comprising means for selecting a desired voice mail message for playing back.

3. The telephone switching system of claim 1, wherein said main equipment comprises:

a plurality of key set interfaces for interfacing with respective key sets of said plurality of key sets, a switch for connecting incoming central office lines, a display interface for interfacing with said display panel connected to said main equipment, and a main control for controlling telephone switching system operations.

4. The telephone switching system of claim 1, wherein said display panel comprises a display and a display conrtol for controlling the operation of the display panel.

5. The telephone switching system of claim 1, wherein each of said key sets of said plurality of key sets comprises a hand set, a dial key for sending messages to other key sets, and a key set control for sending dial information and contents of a voice mail message to said voice storage equipment.

\* \* \* \* \*